March 30, 1926.
E. LOHMANN
REFLECTING TELESCOPE
Filed Feb. 21, 1924   3 Sheets-Sheet 1
1,578,899
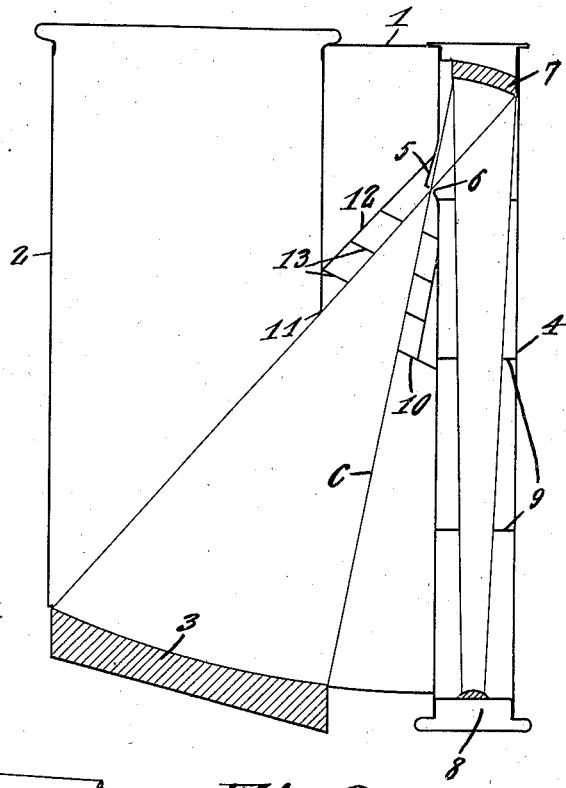
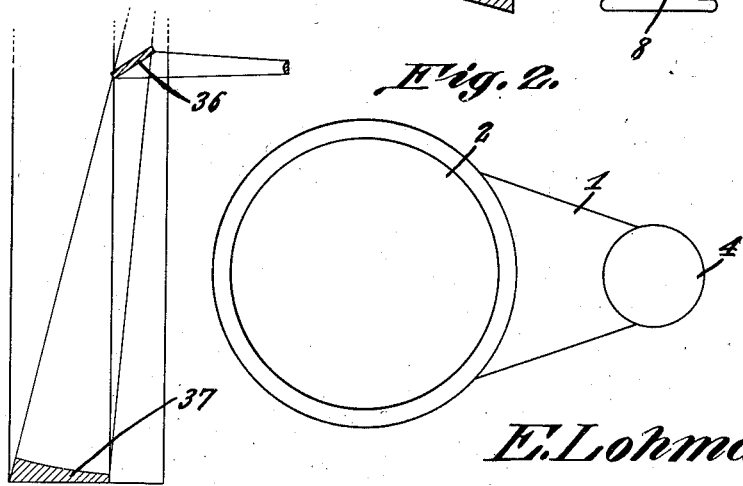
E. Lohmann, Inventor

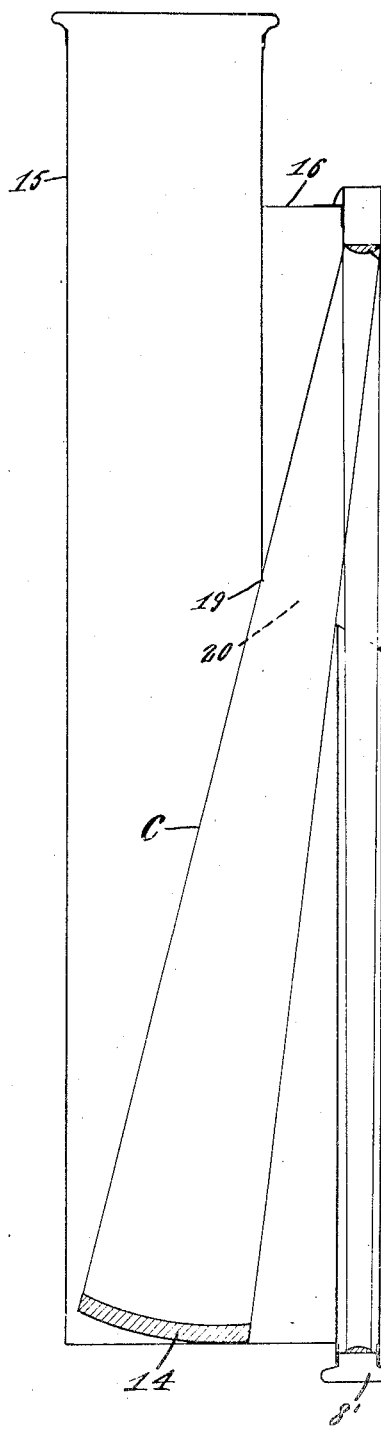
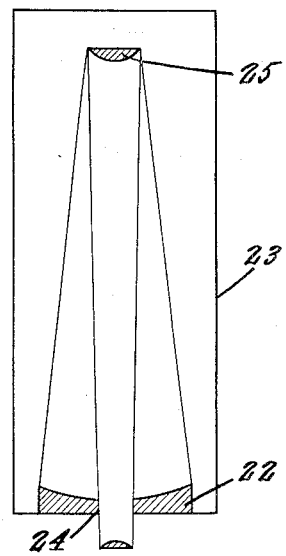
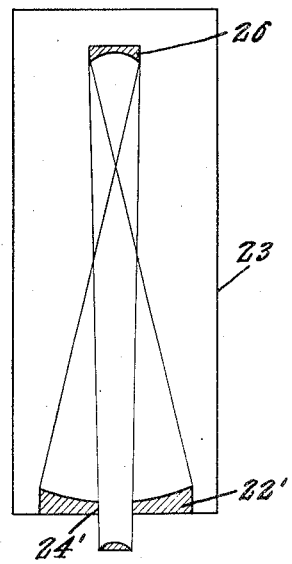

March 30, 1926.  E. LOHMANN  1,578,899

REFLECTING TELESCOPE

Filed Feb. 21, 1924   3 Sheets-Sheet 3

Patented Mar. 30, 1926.

1,578,899

UNITED STATES PATENT OFFICE.

EDWARD LOHMANN, OF GREENVILLE, OHIO.

REFLECTING TELESCOPE.

Application filed February 21, 1924. Serial No. 694,360.

*To all whom it may concern:*

Be it known that I, EDWARD LOHMANN, a citizen of the United States, residing at Greenville, in the county of Darke and State of Ohio, have invented a new and useful Reflecting Telescope, of which the following is a specification.

This invention relates to reflecting telescopes, its object being to eliminate certain objectionable characteristics of the Cassegrainian, Gregorian, Herschelian and even Newtonian telescopes.

It is a well known fact to those skilled in the art that the use of reflecting telescopes of the most valuable forms is hampered materially by the admission of a large amount of skylight and while various means have been employed for reducing this objectionable light, as by the use of sets of very small diaphragms, such means have been objectionable because of their size which renders them difficult to keep any adjustment, and, also because, at best, they do not entirely remedy the defect mentioned even for night use while for daylight observations they are practically of no value.

It is an object of the present invention to simplify the construction of reflecting telescopes especially the Cassegrainian and Gregorian forms, making them practical not only for night use but also for daylight use, the efficiency of the instrument being increased by the reduction of light absorbing surfaces and the corresponding reduction in the number of parts used.

A further object is to provide a means whereby the cone of light reflected within the instrument is caused to pass, at its apex, through a small opening thereby to eliminate skylight.

A still further object is to provide a supplemental means in the form of a curtain or partition fitting the light cone and which supplements the action of the apex receiving aperture to eliminate objectionable light so as to render the images brighter and more clearly defined than would otherwise be possible.

A further object is to provide an improved assemblage whereby the members of the Cassegrainian and Gregorian forms of reflecting telescopes can be embodied in field glasses and the like designed for terrestrial use, thus giving results far superior to those heretofore acquired in binoculars utilizing prisms.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred forms of the invention have been shown.

In said drawings—

Figure 1 is a view, more or less in diagram, showing the present improvements combined with a reflecting telescope of the Gregorian form.

Fig. 2 is an end view of the structure shown in Fig. 1.

Fig. 3 is a view similar to Fig. 1 illustrating the improvements combined with a reflecting telescope of the Cassegrainian form.

Fig. 4 is a view similar to Figs. 1 and 2 showing the type of telescope heretofore used wherein the light rays are returned from a convex through a hole in a large reflecting mirror which is exposed to skylight and thus rendered deficient.

Fig. 5 is a view similar to Fig. 4 showing the light rays passing from a large mirror to a concave and thence through a hole in the mirror which is likewise exposed to skylight.

Fig. 7 is a view in diagram showing the present improvements applied to a Newtonian telescope.

Figure 6:
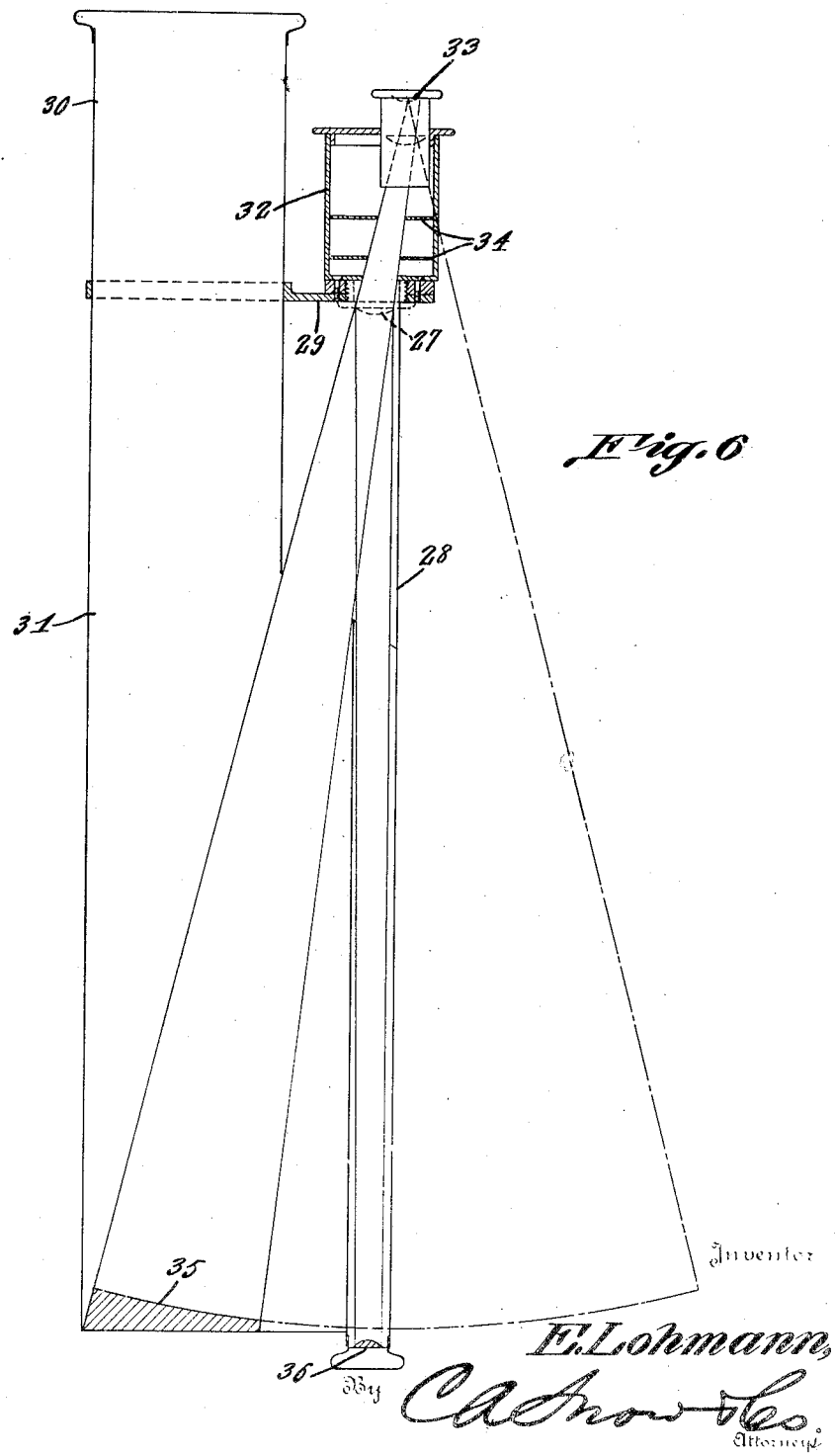
Fig. 6 is a view similar to Figs. 1 and 3 showing a convenient arrangement of parts of the telescope whereby the same may be converted readily from one form of telescope to another.

Referring to the figures by characters of reference 1 designates a casing of any suitable porportions and construction provided with a tube 2 through which light rays are received by a concave reflecting mirror 3. A tube 4 is located at one side of the casing and can be of any desired cross sectional contour. It can be in the form of a cylindrical tube as shown in Figs. 1 and 2 or can be a separate compartment formed by extending a partition across the casing 1. This tube 4 is preferably offset as at 5 where it is formed with a small opening 6 designed to receive the apex of a conical field of light indicated generally at C reflected from the mirror 3 to the concave mirror 7 supported in the closed end of the tube 4. This mirror, in turn, directs the rays to the eye piece 8 located at the other end of the tube 4 and the tube of this eye piece may, if desired, be provided with apertured diaphragms or stops 9 although these are not essential. The cone of light indicated at C may be extended through a diaphragm or partition 10 located between the tubes 2 and 4 and having an opening 11 therein of the same diameter as that portion of the light cone positioned in the opening. Any desired number of these diaphragms 10 can be used or, if perferred, the light cone can be extended through a tube 12 containing a series of spaced diaphragms as shown at 13, the openings in the diaphragms corresponding with the diameters of those portions of the light cone C within the diaphragms.

The construction described is that of a Gregorian reflecting telescope. Where the improvements are combined with a telescope of the Cassegrainian type as illustrated in Fig. 3, the light cone C is reflected from a large concave mirror 14 at one end of the main tube 15 projecting from the casing 16 and this cone, before reaching the convex reflecting mirror 17 in the tube 18 passes through an opening 19 in a diaphragm 20. This opening is of the same diameter as that portion of the light cone passing therethrough and, if desired, the diaphragm can be extended so as to intersect the tube 18 where it is provided with another opening 21 the diameter of which is equal to the diameter of that portion of the light cone within the opening 21.

It will be noted that in both forms of telescope herein described skylight is positively eliminated and will not reduce the efficiency of the instrument. Reflecting telescopes of the Cassegrainian and Gregorian types heretofore used have employed concave reflecting mirrors 22 see Figs. 4 and 5, located at one end of the main tubes 23 and provided with central openings 24. A convex reflecting mirror 25 has been supported as in Fig. 4 so that the light rays reflected from the mirror 22 have passed the mirror 25 and into the opening 24 or else have passed a concave reflecting mirror 26 through an opening 24' in the large reflecting mirror 22' as in Fig. 5. In each instance there has been no way to eliminate the skylight and the same entering the tube 23 has passed through the hole in the mirror 25 or 26 and thus greatly reduced the strength of the image. This has been true even though small diaphragms have been used and at best telescopes of this type and as illustrated in Figs. 4 and 5 are defective for night use and are of practically no value for daylight observations.

In the present instance skylight is eliminated by projecting a light cone C through one or more openings located between the large reflecting mirror and the eye piece and preferably by the utilization of a small opening in which is located the apex of the light cone produced in a telescope of the Gregorian form.

It has been found that with an arrangement of this kind the field can be made perfectly dark in the brightest daylight and accurate observations can thus be made readily without the hampering influences ordinarily resulting from the admission of skylight and other rays. As a matter of fact the members embodied in these forms of telescopes can be utilized in the construction of binoculars and field glasses for terrestrial use. They are much cheaper, lighter, yield greater illumination aperture for aperture, and are perfect in chromatic correction. In the modern prism binocular an achromatic objective with four surfaces is used, plus two prisms equivalent to four additional surfaces. Between 4% and 5% of the light is lost at each of these eight surfaces besides that portion of the light absorbed in passing through the objective and prisms. In addition thereto one or more eye lenses are necessary adding at least two more surfaces, or ten in all, so that nearly 50% of the light is lost. In a telescope such as herein described but two reflecting surfaces are required in the field glass and each surface reflects 95% of the light. Thus a great saving in illumination is effected. Furthermore in the Gregorian form the small concave mirror erects the image and at the same time magnifies it, its power depending on the relative length of foci of the large mirror 3 and the small one 7, usually about 6 to 1. In other words the mirror magnifies the image about six times without the use of an eye lense. All of these distinct and important advantages are made practical by the improvement herein described and apertures up to three inches or more can be built into a short compass and yield brilliant illumination so that good sight can be had on dark days and in gathering dusk when the less effective refractor forms would be useless. High magnifying power can be attained readily by the use of comparatively shallow eye lenses, the focal length of the instruments being relatively long, due to the action of the small convex mirror in the Cassegrainian form or the small concave mirror in the Gregorian form.

It is to be understood that the Cassegrainian form shown in Fig. 3 can be converted readily into a Herschelian telescope by removing the eye piece from the lower end of the tube 18, closing said end and placing the eye piece at the other end. In Fig. 6 has been shown a Herschelian telescope formed from a Cassegrainian telescope. Where the parts are to be interchanged, as in this form, it is desirable for the small mirror 27 in the tube 28 to be close to the frame member or casing 29 of the telescope so that the said mirror 27 is thus supported conveniently at the surface of the casing 29 and is easily accessible. Thus the mirror can be conveniently adjusted.

A removable extension 30 is provided on the tube 31 and another tube 32 is mounted on the tube 28 and carries the eye piece 33. Stops 34 may be employed within the tube 32. This construction is advantageous because it enables the large tube to be shortened several inches when the structure is used as a Cassegrainian telescope. This is due to the fact that the tube 32, which is used only for a Herschelian, and the tube 30, can be removed when used as a Cassegrainian, thus making the main tube shorter and lighter by about the length of the focus of the small mirror 27. This construction provides a chance to place stops 34 in the tube 32. It is preferred to make the tube or extension 32 as shown in Fig. 6 so as to touch the light cone where it passes through the casing or frame member 29, and to bring the eye piece 33, when used as a Herschelian, to the outer edge of the extension tube 32 to properly meet the light cone from the large mirror 35, at its focus.

It is to be understood that in all forms of the telescope disclosed the eye pieces stand parallel with the tube and do not point at an angle toward the large mirrors. It will be obvious, of course that a tube 28 is not used except when the mirror 27 is in place and the light is thrown to the remote end 36 of the tube 28.

The section 30 of the tube 31 is necessary when the telescope is used as a Herschelian because it thus acts as a guard to keep the heat of the observer from affecting the light rays passing down the tube to the large mirror. Of course when the observations are made from the end 36 of the tube 28 the sections 30 and 32 are useless and should be removed.

By referring to Fig. 7 the advantages of the present improvements in a Newtonian telescope will be apparent. Heretofore the flat mirror has been mounted in the tube where some of the rays have been interfered with by the mirror and its supporting arm or arms. In the present instance the flat mirror 36 can be placed at any desired point in the light cone outside of the circle, of the mirror 37, thereby removing all obstructions likely to interfere with the light rays.

What is claimed is :—

1. In a telescope the combination with separate tubes, an eye piece connected to one of the tubes and an imperforate mirror in the other tube for reflecting an image to the eye piece, of a diaphragm through which the light cone is projected from one tube to the other, there being an opening in the diaphragm of the same diameter as that portion of the light cone at the opening.

2. A telescope including connected tubes, an eye piece connected to one of the tubes, a large reflecting mirrror in the other tube for directing a light cone from one tube to the other, and means for eliminating the skylight within the telescope, said means including a diaphragm having an opening therein through which the light cone projected from the large mirror is extended, said opening being so shaped and proportioned as to prevent the passage therethrough of practically all light rays outside of the projected cone.

3. In a telescope the combination with separate tubes, an eye piece connected to one of the tubes, and a mirror within each of the tubes, the mirror in one of the tubes constituting means for projecting a cone of light to the mirror in the other tube, there being an aperture between the mirrors through which the light cone is extended, said aperture being shaped and proportioned to exclude practically all rays exterior of the light cone.

4. In a telescope the combination with separate tubes, an eye piece connected to one of the tubes, a mirror in one tube for reflecting an image to the eye piece and a mirror in the other tube for reflecting a light cone to the first named mirror, of a diaphragm between the mirrors having an opening through which the light cone extends, said opening being so shaped and proportioned as to exclude practically all light rays exterior of the cone, there being a small aperture between the tubes for receiving the apex of the light cone.

5. In a telescope the combination with separate tubes, an eye piece connected to one of the tubes, and a mirror for projecing a cone of light from one tube into the other, of a plurality of apertured members through which spaced portions of the light cone are extended, the apertures being so shaped and proportioned as to eliminate practically all rays exterior of the cone.

6. In a telescope the combination with separate tubes, of a large reflecting mirror in one of the tubes, a small mirror in the other tube, an eye piece carried by the last named tube, said mirrors cooperating to deflect a light cone from the first named tube to the eye piece, and means interposed between the mirrors for eliminating practically all light rays exterior of the light cone.

7. In a telescope the combination with separate tubes, of a large reflecting mirror in one of the tubes, a small mirror in the other tube, an eye piece carried by the last named tube, said mirrors cooperating to deflect a light cone from the first named tube to the eye piece, and means interposed between the mirrors for eliminating practically all light rays exterior to the light cone, said means including spaced apertures for receiving different portions of the light cone and so shaped and proportioned as to exclude practically all rays outside of the cone.

8. In a telescope the combination with separate tubes and removable extensions upon the tubes, of a mirror removably mounted in one of the tubes close to its extension, an eye piece carried by said extension, and a large reflecting mirror carried by the other tube, said eye piece being shiftable to position at the other end of the tube on which its extension is mounted.

In testimony that I claim the foregoing as my own, I have hereto affixed my signature.

EDWARD LOHMANN.